United States Patent [19]

Kato et al.

[11] 4,370,379

[45] Jan. 25, 1983

[54] METHOD FOR PREPARING ORIGINAL FOR PROJECTION AND TRANSFER FILM FOR ELECTROSTATIC PHOTOGRAPHY FOR USE IN CARRYING OUT SAID METHOD

[75] Inventors: Mamoru Kato, Hirakata; Shoji Matsumoto, Neyagawa; Tatsuo Aizawa, Osaka, all of Japan

[73] Assignee: Mita Industrial Company Limited, Osaka, Japan

[21] Appl. No.: 284,069

[22] Filed: Jul. 16, 1981

Related U.S. Application Data

[62] Division of Ser. No. 139,480, Apr. 11, 1980, Pat. No. 4,320,186.

[30] Foreign Application Priority Data

Apr. 13, 1979 [JP] Japan ................................ 54/44263

[51] Int. Cl.[3] ...................... B32B 27/06; B32B 27/36; G03G 13/16

[52] U.S. Cl. .................................. 428/341; 428/409; 428/480; 428/483; 428/930; 430/98; 430/126

[58] Field of Search ............... 428/341, 480, 483, 930; 430/126, 98, 99, 124

[56] References Cited

U.S. PATENT DOCUMENTS

| | | | |
|---|---|---|---|
| 2,855,324 | 10/1958 | Van Dorn | 430/126 |
| 3,535,112 | 10/1970 | Dolce et al. | 430/126 |
| 4,199,356 | 4/1980 | Matsumoto et al. | 430/126 |
| 4,256,822 | 3/1981 | Tarumi et al. | 428/483 |

*Primary Examiner*—Thomas J. Herbert, Jr.

*Attorney, Agent, or Firm*—Sherman & Shalloway

[57] ABSTRACT

A transfer film comprising a transparent plastic film substrate, an undercoating layer composed of an electrically conductive resin and having a surface resistance of $1.0\times10^6$ to $9.0\times10^9\ \Omega$, and a toner receiving layer composed of a binder resin and having a surface resistance of $1.0\times10^{10}$ to $1.0\times10^{14}\ \Omega$, which is formed on at least one surface of the transparent plastic film substrate through the undercoating layer.

7 Claims, 1 Drawing Figure

METHOD FOR PREPARING ORIGINAL FOR PROJECTION AND TRANSFER FILM FOR ELECTROSTATIC PHOTOGRAPHY FOR USE IN CARRYING OUT SAID METHOD

This is a division of application Ser. No. 139,480, filed Apr. 11, 1980, now U.S. Pat. No. 4,320,186 issued Mar. 16, 1982.

BACKGROUND OF THE INVENTION (1) Field of the Invention:

The present invention relates to a method for preparing an original for projection according to the electrophotographic process and also to a transfer film for the electrostatic photography, which is used for carrying out this method. More particularly, the present invention relates to a method for preparing an original for projection, which is excellent in the smoothness and image characteristics.

(2) Description of the Prior Art:

The conventional method for preparing a projection original for an overhead projector (transparent sheet) according to the electrostatic photography comprises transferring a toner image formed on a photosensitive plate for the electrophotography by known means, onto a biaxially stretched polyester film, and fixing the transferred toner image on the film by a heat oven or the like. Among various plastic films, a biaxially stretched polyester film is especially excellent in the heat resistance and the dimension stability, but this film is defective in that the film surface is rendered uneven by the heat applied at the step of fixing the toner image and the surface smoothness is lost.

Furthermore, since the electric resistance of such polyester film is too high, when the transfer film is peeled from the photosensitive plate on transfer of the toner image, discharge breakdown is caused between the photosensitive plate and the film and white spots are formed on the solid black portion of the image by this discharge breakdown. This is another defect of the polyester film. Moreover, because of uneven contact between the photosensitive plate and the transfer film and scattering of the toner on peeling of the transfer film from the photosensitive plate, the difference of the transfer efficiency among areas and the disarray of the transferred image, especially in areas of fine lines, are caused and therefore, an original for projection which corresponds precisely to the original to be reproduced cannot be obtained.

It may be considered that these defects will be eliminated by subjecting the above-mentioned polyester film to a treatment for rendering the surface electrically conductive. In case of a one-component type developer described hereinafter, the transfer efficiency is drastically reduced by such conductive treatment, and a defect of drastic reduction of the image density in the original for projection results.

It may also be considered that the above-mentioned undesired loss of the surface smoothness by heat fixation will be overcome by the use of a one-component type magnetic developer for pressure fixation. However, ordinary polyester films have no fixing property of such developer and therefore, disturbance of the image becomes more prominent owing to scattering of the developer particles on contact with a fixing pressure roller.

SUMMARY OF THE INVENTION

It is therefore a primary object of the present invention to provide a method for preparing an original for projection, which is excellent in the surface smoothness and image characteristics and also provide a transfer film for use in carrying out this method.

Another object of the present invention is to provide a method for preparing an original for projection, in which an image is formed on a transparent film by the combination of a one-component type magnetic developer and a pressure fixation method.

Still another object of the present invention is to provide a transfer film for the electrostatic photography, which has a novel multi-layer structure and is excellent in the property of receiving a transferred one-component type magnetic developer and also in the adaptability to pressure fixation of the transferred one-component type magnetic developer.

In accordance with the present invention, there is provided a method for preparing an original for projection, which comprises electrostatically transferring an image of a one-component type magnetic developer on a photosensitive plate for the electrostatic photography, onto a toner receiving layer of a transfer film, which is composed of a binder resin and has a surface resistance of $1.0\times10^{10}$ to $1.0\times10^{13}$ Ω and which is formed on at least one surface of a transparent plastic film substrate of the transfer film through an undercoating layer composed of an electrically conductive resin and having a surface resistance of $1.0\times10^{6}$ to $9.0\times10^{9}$ Ω, and bringing the transferred developer image into contact with the surface of a roller under application of a pressure, thereby to fix the transferred developer image on said toner receiving layer.

DETAILED DESCRIPTION OF THE PREFERRED EMBODIMENTS

Figure 1:
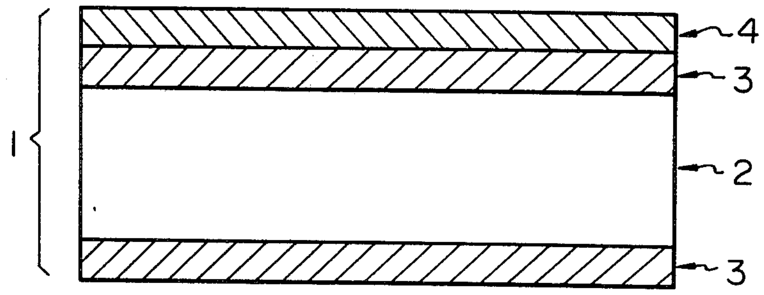
FIG. 1 is a sectional view illustrating the sectional structure of the transfer film according to the present invention.

Referring to FIG. 1 illustrating the sectional structure of the transfer film for the electrostatic photography, that is used in the present invention, this transfer film 1 comprises a transparent plastic film substrate 2, an undercoating layer 3 formed on at least one surface of the substrate 2 and a toner receiving layer 4 formed on the undercoating layer 3.

It is important that the film substrate 1 should be transparent and should have a heat resistance high enough to withstand radiation of the heat by an overhead projector. From this viewpoint, it is preferred that a biaxially stretched polyethylene terephthalate film, for example, a Mylar film, be used as the film substrate 2. The thickness of the film is not particularly critical, but from the viewpoint of easiness in handling, it is preferred that the film thickness be in the range of 50 to 200 microns. Transparent films other than polyester films, for example, cellulose acetate films, poly-4-methylpentene-1 films, polycarbonate films and polysulfone films, can be used in the present invention.

For formation of the undercoating layer 3, a coating composition comprising an electrically conductive resin and providing a surface resistance of $1.0\times10^{6}$ to $9.0\times10^{9}$ Ω (in the instant specification and claims, the surface resistance is the surface electric resistance measured at a temperature of 20° C. and a relative humidity of 40%, unless otherwise indicated) is used.

This coating composition may be composed solely of a cationic or anionic, electrically conductive resin, or it may comprise an ordinary binder resin described hereinafter, in combination with such electrically conductive resin. If desired, one or more of dyes, pigments, fillers and anchoring agents may be incorporated into the coating composition so far as the transparency of the final film is not substantially degraded.

As the electrically conductive resin, there can be used a cationic, electrically conductive resin having a quaternary ammonium group on the main chain or side chain and an anionic, electrically conductive resin of the sulfonic acid, carboxylic acid or phosphonic acid type. Preferred examples of such electrically conductive resins are as follows.

(1) Resins having a quaternary ammonium group in the main chain, such as condensates of di-tertiary-amines, such as quaternized polyethyleneimines and ionenes, with dihalides.

(2) Resins having a quaternary amino group integrated with the cyclic main chain, such as condensates of polypyrazine, quaternized polypiperazine, poly(dipyridyl) and 1,3-di-4-pyridylpropane with dihaloalkanes.

(3) Resins having a quaternary ammonium group on the side chain, such as polyvinyl trimethyl ammonium chloride and polyallyl trimethyl ammonium chloride.

(4) Resins having a side chain quaternary ammonium group on the cyclic main chain, such as resins consisting of recurring units represented by the following formula:

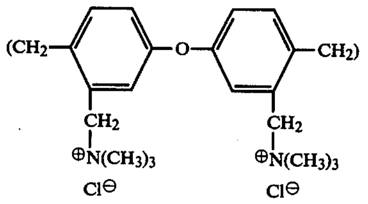

(5) Resins having a quaternary ammonium group on the cyclic side chain, such as poly(vinylbenzyltrimethyl ammonium chloride).

(6) Resins having a quaternary ammonium side chain on the acrylic skeleton, for example, quaternary acryl esters such as poly(2-acryloxyethyltrimethyl ammonium chloride) and poly(2-hydroxy-3-methacryloxypropyltrimethyl ammonium chloride), and quaternary acrylamides such as poly(N-acrylamidopropyl-3-trimethyl ammonium chloride).

(7) Resins having a quaternary ammonium group on the heterocyclic side chain, such as poly(N-methylpyridinium chloride) and poly(N-vinyl-2,3-dimethylimidazolinium chloride).

(8) Resins having a quaternary ammonium group on the heterocyclic main chain, such as poly(N,N-dimethyl-3,5-methylene-piperidinium chloride) and its copolymers.

(9) Electrically conductive resins of the carboxylic acid type, such as polyacrylic acid salts, polymethacrylic acid salts, maleic acid-acrylic acid copolymer salts and maleic acid-vinyl ether copolymer salts.

(10) Electrically conductive resins of the sulfonic acid type, such as polystyrene-sulfonic acid salts, polyvinyltoluene-sulfonic acid salts and polyvinylsulfonic acid salts.

(11) Electrically conductive resins of the phosphonic acid type, such as polyvinylphosphonic acid salts.

From the viewpoint of the electrical conductivity, it is preferred that the electrically conductive resin be present in an amount of at least 25% by weight in the undercoating layer.

The electrically conductive undercoating layer is applied in an amount of 1.0 to 10.0 $g/m^2$ on the dry basis. This undercoating layer may be formed on one or both of the surfaces of the film substrate. The undercoating layer can easily be formed by dissolving the electrically conductive resin in a lower alcohol such as methanol or ethanol or a lower ester such as ethyl acetate, coating the solution by using an optional coater and drying the coated solution according to need. In order to improve the adhesiveness to the undercoating layer, the film substrate may be subjected to a matting treatment, an ozone treatment, a corona discharge treatment or an anchoring treatment with an organic titanate or isocyanate.

According to the present invention, a toner receiving layer 4 composed of a binder resin is formed on the above-mentioned undercoating layer 3. It is important that the binder resin constituting the toner receiving resin 4 should have a surface resistance of $1.0\times10^{10}$ to $1.0\times10^{13}$ Ω. In order to maintain the non-viscous state on the toner receiving layer after pressure fixation of the one-component type magnetic developer, it is preferred that the binder resin be a thermoplastic resin having a glass transition temperature of −50° to 150° C., especially 0° to 70° C. Moreover, in order to obtain a projection original of high quality, it is preferred that the binder resin be excellent in the transparency.

In view of the foregoing, in the present invention, it is preferred that an acrylic resin be chosen among various thermoplastic resins and be used as the binder resin. Either an organic solvent-soluble acrylic resin or an acrylic resin self-emulsifiable or dispersible in water can be used.

As the monomer constituting the acrylic resin, there can be mentioned, for example, acrylic esters such as ethyl acrylate, ethyl β-hydroxyacrylate, propyl γ-hydroxyacrylate, 2-ethylhexyl acrylate, methyl methacrylate and propyl methacrylate, and acrylic acid, methacrylic acid, maleic acid, crotonic acid and fumaric acid. Any of homopolymers and copolymers of these monomers may be used so far as the surface resistance is within the above-mentioned range.

The acrylic resins used may be copolymers of acrylic monomers with other comonomers, for example, vinyl aromatic monomers such as styrene and vinyltoluene, vinyl halide monomers such as vinyl chloride and vinylidene chloride, vinyl ester monomers such as vinyl acetate, olefins such as ethylene and propylene, and vinylketone, vinyl ether and vinylpyridine. Self-emulsifiable acrylic resins are acrylic resins having an acid value of 39 to 85, in which the contained carboxyl group is in the form of an ammonium salt.

As the thermoplastic binder resin other than the acrylic resin, there can be used styrene resins such as polystyrene and styrene-butadiene copolymers, vinyl chloride resins, vinyl acetate resins and solvent-soluble linear polyester resins.

The toner receiving layer is formed by applying the binder resin in an amount of 1.0 to 10.0 $g/m^2$ on the dry basis. When the toner receiving layer is formed, the binder resin is dissolved or dispersed in a solvent in which the electrically conductive undercoating layer is not substantially re-dissolved and the resulting solution or dispersion is applied by coating on the electrically conductive undercoating.

This toner receiving layer may be formed on one side or both the sides of the film substrate.

If a toner receiving layer of a binder resin having a high electric resistance is formed on a transparent plastic film substrate through an electrically conductive undercoating layer according to the present invention, various unexpected advantages can be attained. First of all, this toner receiving layer is especially excellent in the property of fixing developer particles and it becomes possible to fix developer particles tightly by embedding them in the surface of the toner receiving layer by application of a pressure without applying the heat causing deformations of the resulting original. Furthermore, by forming the above two coating layers on the surface of the film substrate, electric characteristics of the toner receiving surface can be rendered most suitable for transfer of one-component type magnetic developers, with the result that a clear image can be formed at a high transfer efficiency without broadening of contours or disturbance of the image by scattering of the toner. Furthermore, this advantage can be attained without formation of white spots on image areas by discharge breakdown. Still further, by virtue of the feature that the toner receiving layer of a high electric resistance is formed on the electrically conductive layer, degradation of the electric characteristics under high humidity conditions can be prevented, and the electric characteristics of the toner receiving layer can always be kept suitable for transfer of one-component type magnetic developers irrespectively of changes in the atmosphere.

In a processed film prepared by forming a resin coating on a biaxially stretched polyester film, so-called blanching is readily caused under high humidity conditions because the water vapor permeability varies remarkably according to the humidity in the atmosphere. However, if the above-mentioned multi-layer structure is adopted according to the present invention, occurrence of this undesirable phenomenon of blanching is prevented, and the transparency of the film can always be maintained at a high level. It is believed that the reason may be that the toner receiving layer of a high electric resistance interrupts permeation of excessive water vapor and the water vapor which is allowed to pass through the toner receiving layer is effectively absorbed and collected in the electrically conductive resin while condensation and accumulation of the water vapor in the interface between the electrically conductive layer and the polyester film can be prevented.

Moreover, the electrically conductive resin applied to the surface of the film substrate acts as an excellent primer to the binder resin layer, and therefore, the composite film of the present invention comes to have excellent adhesion and durability.

The original for projection according to the present invention can easily be prepared by the known method except that the above-mentioned transfer film is used and the transferred one-component type magnetic developer is fixed by application of a pressure.

As the photosensitive plate for the electrostatic photography, there can be used a selenium vacuum-deposited photosensitive plate, a zinc oxide-binder photosensitive plate and a photosensitive plate comprising an organic polymer photoconductor. An electrostatic latent image is formed, for example, through the steps of uniform charging of the entire surface and imagewise exposure.

Development of the electrostatic latent image can easily be accomplished by contacting the electrostatic latent image on the photosensitive plate with magnetic brushes of a one-component type magnetic developer.

The one-component type magnetic developer used can be pressure-fixed and has a property of being attracted by a magnetic force. Ordinarily, the one-component type magnetic developer is composed of particles formed by dispersing a finely divided magnetic material in a binder medium consisting of a wax and a resin binder and shaping the resulting dispersion. Triiron tetroxide or $\gamma$-diiron trioxide is preferred as the finely divided magnetic material, and the finely divided magnetic material is used in an amount of 18 to 80% by weight based on the developer. As the wax, there can be used natural, synthetic and denatured waxes such as paraffin wax, petrolatum, polyethylene wax, microcrystalline wax, bees wax, hydrous lanolin, cotton wax, carnauba wax, montan wax, hydrogenated beef tallow, higher fatty acids, higher fatty acid maides, various soaps and other higher fatty acid derivatives.

As the resin binder, there can be used natural and synthetic resins. Balsam resins, rosins, shellac resins and copal resins are preferred natural resins. These natural resins may be modified with at least one member selected from vinyl resins, acrylic resins, alkyd resins, phenolic resins, epoxy resins and oleoresins described hereinafter. As the synthetic resin that can be used, there can be mentioned, for example, vinyl resins such as vinyl chloride resins, vinylidene chloride resins, vinyl acetate resins, vinyl acetal resins, e.g., polyvinyl butyral, and vinyl ether polymers, acrylic resins such as polyacrylic acid esters, polymethacrylic acid esters, acrylic acid copolymers and methacrylic acid copolymers, olefin resins such as polyethylene, polypropylene, polystyrene, hydrogenated styrene resins, ethylene-vinyl acetate copolymers and styrene copolymers, polyamide resins such as nylon-12, nylon-6 and polymerized fatty acid-modified polyamides, polyesters such as polyethylene terephthalate/isophthalate and polytetramethylene terephthalate/isophthalate, alkyd resins such as phthalic acid resins and maleic acid resins, phenol-formaldehyde resins, ketone resins, coumarone-indene resins, amino resins such as urea-formaldehyde resins and melamine-formaldehyde resins, and epoxy resins. These synthetic resins may be used in the form of a mixture of two or more of them, for example, a mixture of a phenolic resin and an epoxy resin or a mixture of an amino resin and an epoxy resin.

The weight ratio of the wax to the resin binder may be changed in the range of from 1/250 to $\frac{1}{3}$.

In order to form an image free of edge effects, the one-component type magnetic developer may be used in the form of an electrically conductive magnetic developer. In this case, 0.001 to 5% by weight of a conducting agent such as carbon black is dispersed in the magnetic developer, embedded in the surfaces of the developer particles or sprinkled on the surfaces of the developer particles.

The one-component type magnetic developer ordinarily has a particle size of from 1 to 30$\mu$ and a volume resistivity of from $10^4$ to $10^{14}$ $\Omega$-cm.

The developer image on the photosensitive plate for the electrostatic photography can easily be transferred onto the toner receiving layer by contacting the developer image with the toner receiving layer of the transfer film and, if necessary, applying charges from the opposite surface of the film.

Fixation of the transferred image can easily be accomplished by passing the film having the developer image transferred thereon through between a pair of pressure rolls. The linear pressure applied by the pressure rollers is ordinarily at least 15 Kg per centimeter of the roller length, especially at least 30 Kg per centimeter of the roller length.

The so obtained original for projection has none of convexities and concavities on the surface thereof and is excellent in the surface smoothness. Furthermore, since the developer image is embedded in the surface of the toner receiving layer and fixed in this state, the fastness of the image is very excellent and the light intercepting property of the image areas is increased, and a projected image excellent in the contrast, density and brightness can be formed by overhead projection. Of course, if the so formed original is used as a second original, since the light intercepting property is high and the background is transparent, the printing operation can be performed at a high speed.

The transfer film of the present invention can be used especially advantageously in the fields where an image of a one-component type developer is transferred and fixed by application of a pressure. However, it must be understood that the transfer film of the present invention may also be applied to the fields where a toner image is formed on a photosensitive plate by using a two-component type magnetic developer, that is, a mixed developer comprising a toner composed of a coloring, electrically conductive resin powder and a magnetic carrier, this toner image is transferred and the transferred toner image is fixed on a toner receiving layer by the action of heat or pressure.

The excellent effects of the present invention will now be described with reference to the following Examples.

EXAMPLE 1

The transfer film of the present invention was compared with a transfer film having the same layer structure as that of the transfer film of the present invention except that the high electric resistance layer or the low electric resistance layer is not formed and a commercially available transfer film with respect to the transfer efficiency, broadening of contours, toner fixing property and stability against a high humidity. Experiments were conducted according to the following procedures.

I. Preparation of Transfer Sheets (I-1) Transfer film of the present invention:

(i) A composition comprising 100 g of methanol, 20 g of an electrically conductive resin (ECA manufactured by ICI) and 20 g of a vinyl acetate resin (SS-1800 manufactured by Shinko Gosei K.K.) was used as a low electric resistant coating liquid for formation of an undercoating layer of the transfer film of the present invention. The composition was coated on a biaxially stretched transparent polyester film having a thickness of 7.5μ (supplied by Toray) by a rod bar coated (0.3 mm in diameter) so that a coated amount was about 5 $g/m^2$, and was dried at 100° C. for 1 minute to obtain a low electric resistance film (A) for the electrostatic photography or electrostatic printing.

(ii) A composition comprising 100 g of toluene, 20 g of an acrylic resin (Dianal LR-018 manufactured by Mitsubishi Rayon K.K.) and 5 g of an acrylic resin (Corponyl PA-70-T manufactured by Nihon Gosei Kahaku K.K.) was used as a high electric resistance coating liquid for formation of a toner receiving layer of the transfer film of the present invention. The composition was coated on the low electric resistance undercoating layer of the above low electric resistance film (A) by a rod bar coater (0.3 mm in diameter) so that the amount coated was 5 $g/m^2$, and was dried at 100° C. for 1 minute to obtain a transfer film (B) for the electrostatic photography or electrostatic printing according to the present invention.

(I-2) Conventional transfer films:

Commercially available transfer films (C), (D) and (E) marketed by companies C, D and E were chosen and used as conventional transfer films.

(I-3) Comparative transfer films:

(i) A composition comprising 100 g of methanol, 20 g of an electrically conductive resin (T-Coat PFX-5033 manufactured by Toyo Ink K.K.) and 20 g of a butyral resin (S-Lex BL-1 manufactured by Sekisui Kagaku Kogyo K.K.) was used as a low electric resistance coating liquid for formation of a toner receiving layer. The composition was coated on a biaxially stretched transparent polyester film having a thickness of 75μ (supplied by Toray) by a rod bar coater (0.3 mm in diameter) so that the amount coated was about 5 $g/m^2$, and was dried at 100° C. for 1 minute to obtain a low electric resistance film (F) for the electrostatic photography or electrostatic printing.

(ii) A composition comprising 100 g of toluene and 30 g of a vinyl chloride-vinyl acetate copolymer (Daikalac manufactured by Daido Kasei Kogyo K.K.) was used as a high electric resistance coating liquid for formation of a toner receiving layer. The composition was coated on a biaxially stretched transparent polyester film having a thickness of 75μ (supplied by Toray) by a rod bar coater (0.3 mm in diameter) so that the amount coated was about 5 $g/m^2$, and was dried at 100° C. for 1 minute to obtain a high electric resistance film (G) for the electrostatic photography or electrostatic printing.

II. Measurement Methods (II-1) Transfer efficiency:

The transfer sheet sample described above was subjected to the transfer operation using an original having a black image in a toner transfer tester manufactured by Mita Industrial Company (zinc oxide photosensitive plate; applied voltage $= -5$ KV), and the transfer efficiency was determined. The value of the transfer efficiency was calculated according to the following formula:

$$\text{Transfer efficiency (\%)} = \frac{A}{B + A} \times 100$$

wherein A stands for the amount of the toner transferred to the transfer sheet and B stands for the amount of the toner left on the zinc oxide photosensitive plate.

Incidentally, the amount of the toner was determined by dissolving out the toner with a solvent (acetone) and measuring the amount of the toner according to the weighing method.

(II-2) Image Clearness and Broadening:

The transferred image was examined with the naked eye and the image clearness and broadening were evaluated based on the results of the naked eye observation.

(II-3) Stability against High Humidity:

(a) Low humidity conditions (temperature of 20° C. and relative humidity of 40%):

The transfer sheet sample was placed in a humidity-adjusted box maintained at a temperature of 20° C. and a relative humidity of 40% for 24 hours, and the transfer efficiency was determined according to the method described in (II-1) above.

(b) High humidity conditions (temperature of 40° C. and relative humidity of 100%):

The transfer sheet sample was placed in a thermostat humidity-adjusted vessel (manufactured by Tabai Seisakusho) maintained at a temperature of 40° C. and a relative humidity of 100% for 5 hours, and the transfer efficiency was determined according to the method described in (II-1) above.

(II-4) Surface resistance:

The surface resistance was measured by electrometers TR-8651 and TR-300B (voltage=50 V) and sample chamber TR-42 (manufactured by Takeda Riken Kogyo), which were combined according to the known method.

(II-5) Toner fixing property:

The transfer operation was carried out on the above-mentioned sample film by using an original having a black image in an electrostatic copying machine (Copystar MC-20 manufactured by Mita Industrial Co.) and the transferred toner image was pressure-fixed. The surface of the fixed image was subjected to the friction test 5 times repeatedly by using a toner fixing tester composed of stainless steel having a diameter of 5 cm, a thickness of 2 cm and a weight of 400 g and covered with gauze (Type I manufactured by Sasaki Hotai K.K.) (manufactured by Mita Industrial Co.). The image density was measured before and after the friction test by a densitometer (Macbeth RD-514 manufactured by Macbeth Color Photometry Division, Kollmorgen Corp.) and the toner fixing ratio (%) was determined. Incidentally, the toner fixing ratio was calculated according to the following formula:

$$\text{Toner fixing ratio } (\%) = (A/B) \times 100$$

wherein A stands for the image density of the copied image after the friction test and B stands for the image density of the copied image before the friction test.

III. Measurement Results

The results obtained at the above-mentioned tests are shown in Tables 1 and 2.

TABLE 1

| | Properties of Transfer Films | | | |
|---|---|---|---|---|
| | 20° C., 40% RH | | | |
| Sample* | Transfer Efficiency (%) | Sharpness of Transferred Image** | Toner Fixing Ratio (%) | Surface Resistance (Ω) |
| (B) | 90–95 | O | 90–95 | $5.0 \times 10^{11}$ |
| (C) | 70–80 | X | 40–50 | $1.2 \times 10^{12}$ |
| (D) | 10–20 | X | 5–10 | $6.7 \times 10^{9}$ |
| (E) | 70–80 | X | 40–50 | $1.3 \times 10^{12}$ |
| (F) | 10–20 | X | 5–10 | $1.3 \times 10^{9}$ |
| (G) | 70–80 | X | 60–70 | $1.6 \times 10^{12}$ |

TABLE 2

| | Properties of Transfer Films | | | |
|---|---|---|---|---|
| | 40° C., 100% RH | | | |
| Sample* | Transfer Efficiency (%) | Sharpness of Transferred Image** | Toner Fixing Ratio (%) | Surface Resistance (Ω) |
| (B) | 80–85 | O | 90–95 | $2.6 \times 10^{11}$ |
| (C) | 60–70 | X | 40–50 | $1.0 \times 10^{12}$ |
| (D) | 5–10 | X | 5–10 | $4.2 \times 10^{8}$ |
| (E) | 60–70 | X | 40–50 | $1.0 \times 10^{12}$ |
| (F) | 5–10 | X | 5–10 | $5.0 \times 10^{7}$ |
| (G) | 60–70 | X | 60–70 | $6.7 \times 10^{11}$ |

Note
*Sample (B) - product of the present invention
Samples (C), (D) and (E) - commercially available products
Samples (F) and (G) - comparative products
**The sharpness of the transferred image was evaluated as follows:
O: sharp without broadening
X: considerable broadening with blurred contours From the results shown in Tables 1 and 2, it is apparent that the transfer film (B) of the present invention is prominently excellent over the comparative transfer sheets (F) and (G) and the commercially available products (C), (D) and (E) in respect to the transfer efficiency, toner fixing property and sharpness of the transferred image under either low humidity conditions or high humidity conditions. For example, in the comparative transfer film (F) free of the high electric resistance layer, which is the indispensable element of the transfer film of the present invention, the transfer efficiency is drastically reduced and the transferred image is obscure, and it is apparent that the sheet cannot be used as an original for projection. In the comparative transfer film (G) free of the low electric resistance layer, which is in the indispensable element of the transfer film of the present invention, the transfer efficiency is relatively high, but scattering of the toner at the pressure fixing step is conspicuous and the transferred image is obscure.

EXAMPLE 2

In order to compare the transfer film of the present invention with a comparative transfer film prepared by forming a low electric resistance undercoating layer in an amount coated of less than 1 g/m$^2$ and a comparative transfer film prepared by forming a high electric resistance toner receiving layer in an amount coated of less than 1 g/m$^2$, the following experiments were carried out.

I. Preparation of Transfer Films (I-1) Transfer film of the present invention:

The transfer film (B) prepared in the same manner as described in Example 1 was used as the transfer film of the present invention.

(I-2) Transfer film having a low electric resistance undercoating layer in an amount coated of less than 1 g/m$^2$:

A composition comprising 100 g of methanol, 5 g of an electrically conductive resin (ECR-34 manufactured by Dow Chemical Co.) and 5 g of a vinyl acetate resin (Daikalac 44C manufactured by Daido Kasei Kogyo K.K.) was used as the low electric resistance undercoating layer-forming composition. The composition was coated on a biaxially stretched transparent polyester film having a thickness of 75μ (supplied by Toray) by a glass bar so that the amount coated was 0.5 g/m$^2$, and was dried at 100° C. for 1 minute to obtain a low electric resistance film (H) for the electrostatic photography or electrostatic printing.

(I-3) Transfer film having a low electric resistance undercoating layer in an amount coated of 5 $g/m^2$:

The same coating composition as described in (1-2) above was coated on a biaxially stretched transparent polyester film having a thickness of 75μ (supplied by Toray) by a rod bar coater (0.3 mm in diameter) so that the amount coated was 5 $g/m^2$, and was dried at 100° C. for 1 minute to obtain a low electric resistance film (I) for the electrostatic photography or electrostatic printing.

(1-4) Transfer film having a high electric resistance toner receiving layer in an amount coated of 5 $g/m^2$:

A composition comprising 100 g of toluene and 10 g of an acrylic resin (Corponyl PA-57T manufactured by Nihon Gosei Kagaku K. K.) was used as the coating composition for formation of a high electric resistance toner receiving layer. The composition was coated on the undercoating layer of the low electric resistance film (H) by a rod bar coater (0.3 mm in diameter) so that the amount coated was 5 $g/m^2$, and was dried at 100° C. for 1 minute to obtain a transfer film (J) for the electrostatic photography or electrostatic printing.

(I-5) Transfer film having a high electric resistance toner receiving layer in an amount coated of less than 1 $g/m^2$:

The same coating composition as described in (I-4) above was coated on the low electric resistance undercoating layer of the low electric resistance film (I) by a glass bar so that the amount coated was 0.5 $g/m^2$, and was dried at 100° C. for 1 minute to obtain a transfer film (K) for the electrostatic photography or electrostatic printing.

II. Measurement Methods

The transfer film described above was tested according to the same procedures as described in Example 1 in respect to the transfer efficiency, clearness, toner fixing property, stability against a high humidity and surface resistance.

III. Measurement Results

The results obtained at the above-mentioned tests are shown in Tables 3 and 4.

TABLE 3

| | Properties of Transfer Films | | | |
|---|---|---|---|---|
| | Properties of Transfer Films | | | |
| Sample | Transfer Efficiency (%) | Sharpness of Transferred Image | Toner Fixing Ratio (%) | Surface Resistance (Ω) |
| Film (B) of present invention | 90–95 | O | 90–95 | $5.0 \times 10^{11}$ |
| Comparative film (J) | 70–80 | X | 60–70 | $5.5 \times 10^{11}$ |
| Comparative film (K) | 70–80 | Δ | 70–80 | $1.2 \times 10^{11}$ |

TABLE 4

| | Properties of Transfer Films | | | |
|---|---|---|---|---|
| | 40° C., 100% RH | | | |
| Sample | Transfer Efficiency (%) | Sharpness of Transferred Image | Toner Fixing Ratio (%) | Surface Resistance (Ω) |
| Film (B) of present invention | 80–85 | O | 90–95 | $2.6 \times 10^{11}$ |
| Comparative film (J) | 60–70 | Δ | 60–70 | $2.7 \times 10^{11}$ |
| Comparative film (K) | 40–50 | X | 60–70 | $8.6 \times 10^{9}$ |

Note
The sharpness of the transferred image was evaluated as follows:
O: sharp without broadening
Δ: slight broadening, low transfer efficiency, relatively obscure
X: conspicuous broadening, obscure, blurred contours From the results shown in Tables 3 and 4, it is apparent that the transfer film (B) of the present invention is prominently excellent over the comparative transfer sheets (J) and (K) in the transfer efficiency, toner fixing property and sharpness of the transferred image under either low humidity conditions or high humidity conditions. For example, the transfer film (J) in which the amount coated of the low electric resistance under coating layer is extremely small is poor in the sharpness of the transferred image under low humidity conditions as in the case of the transfer film having no low resistance undercoating layer. In the transfer film (K) in which the amount coated of the high electric resistance toner receiving layer is extremely small, the transfer efficiency is low and the transferred image is obscure under high humidity conditions.

EXAMPLE 3

The transfer film of the present invention was compared with a transfer film having an undercoating layer having a surface electric resistance lower than $1.0 \times 10^6$ Ω and a comparative film having an undercoating layer having a surface electric resistance higher than $9.0 \times 10^9$ Ω according to the following experimental procedures.

I. Preparation of Transfer Films (I-1) Transfer film of the present invention:

The transfer film (B) prepared in the same manner as described in Example 1 was used as the transfer film of the present invention.

(I-2) Transfer film having an undercoating layer having a surface electric resistance lower than $1.0 \times 10^6$ Ω:

A composition comprising 100 g of methanol and 100 g of an electrically conductive resin (ECR-34 manufactured by Dow Chemical Co.) was used as the coating composition for formation of an undercoating layer. The composition was coated on a biaxially stretched transparent polyester film by a rod bar coater (0.5 mm in diameter) so that the amount coated was 8 $g/m^2$, and was dried at 70° C. for 30 seconds to obtain an undercoated transfer film (L) for the electrostatic photography or electrostatic printing. The surface resistance of this film was $8.0 \times 10^6$ Ω.

A composition comprising 100 g of toluene and 20 g of an acrylic resin (Corponyl PA-57T manufactured by Nihon Gosei Kagaku K. K.) was used as the coating composition for formation of a toner receiving layer. The composition was coated on the undercoating layer of the undercoated film (L) by a rod bar coater (0.3 mm in diameter) so that the amount coated was 5 g/$m^2$, and was dried at 100° C. for 1 minute to obtain a transfer film (M) for the electrostatic photography or photographic printing.

(I-3) Transfer film having an undercoating layer having a surface electric resistance higher than $9\times10^9$ Ω:

A composition comprising 100 g of methanol and 20 g of a self-emulsifiable acrylic resin (Jurimer AT-510 manufactured by Nihon Junyaku K. K.) was used as the coating composition for formation of an undercoating layer. The composition was coated on a biaxially stretched transparent polyester film having a thickness of 100μ (supplied by Toray) by a rod bar coater (0.3 mm in diameter) so that the amount coated was 5 g/$m^2$, and was dried at 100° C. for 1 minute to obtain an undercoated film (N) for the electrostatic photography or electrostatic printing. The surface resistance of the film was $2\times10^{10}$ Ω.

The same coating composition for formation of a toner receiving layer, as described in (I-2) above, was coated on the undercoating layer of the undercoated film (N) in the same manner as described in (I-2) above so that the amount coated was 5 g/$m^2$, and was dried at 100° C. for 1 minute to obtain a transfer film (O) for the electrostatic photography or electrostic printing.

II. Measurement Methods

The transfer film described above was tested in respect to the transfer efficiency and sharpness of the transferred image according to the methods described in Example 1.

III. Measurement Results

The results obtained at the above-mentioned tests are shown in Table 5.

TABLE 5

| Sample | Transfer Efficiency (%) | Sharpness of Transferred Image |
|---|---|---|
| Transfer film (B) of present invention | 90–95 | O |
| Comparative transfer film (M) | 10–20 | X |
| Comparative transfer film (O) | 60–70 | X |

Note
The sharpness of the transferred image was evaluated as follows:
O: sharp with broadening
X: obscure with conspicuous broadening

EXAMPLE 4

A composition comprising 100 g of methanol, 10 g of an electrically conductive resin (EC-CO5 manufactured by Nihon Kayaku K. K.) and 20 g of a self-emulsifiable acrylic resin (Jurimer AT-510 manufactured by Nihon Junyaku K. K.) was used as the composition for formation of a low electric resistance undercoating layer. The composition was coated on a biaxially stretched transparent film having a thickness of 100μ (supplied by Toray) by a rod bar coater (0.3 mm in diameter) so that the amount coated was about 5 g/$m^2$, and was dried at 100° C. for 1 minute to obtain an undercoated low electric resistance transfer film for the electrostatic photography or photographic printing.

A composition comprising 100 g of toluene and 20 g of a polyester resin (Vylon 206 manufactured by Toyobo K. K.) was used as the coating composition for formation of a toner receiving layer. The composition was coated on the undercoating layer of the above undercoated film so that the amount coated was 5 g/$m^2$, and was dried at 100° C. for 1 minute to obtain a transfer film for the electrostatic photography or electrostatic printing.

The transfer operation was carried out on the so formed transfer film by using an original having an image in an electrostatic photographic copying machine (Copystar MC-20 manufactured by Mita Industrial Co.). An image which was clear and free of broadening and had a good toner fixing property was formed on the transfer film at a transfer efficiency of 95%.

EXAMPLE 5

The same undercoating layer-forming coating composition as used in Example 4 was coated on both the surfaces of a biaxially stretched transparent polyester film having a thickness of 100μ (supplied by Toray) so that the amount coated was 5 g/$m^2$ on each surface, and was dried at 100° C. for 1 minute to obtain an undercoated low electric resistance film. The same toner receiving layer-forming coating composition as used in Example 4 was coated on both the undercoating layers of the undercoated film in the same manner as described in Example 4. The transfer operation was carried out in the same manner as in Example 4. Good results were obtained as in Example 4.

EXAMPLE 6

A transfer film was prepared in the same manner as described in Example 4 except that a matted polyester film having a thickness of 125μ (Melinex Polyester Film Type 542 manufactured by I.C.I., Japan) was used instead of the biaxially stretched polyester film used in Example 4. The transfer operation was carried out in the same manner as described in Example 4. Good results were obtained as in Example 4.

EXAMPLE 7

A coating composition comprising 100 g of methanol, 20 g of an electrically conductive resin (T-Coat PFX-5054 manufactured by Toyo Ink K. K.) and 5 g of a pigment (Alumina C-15A manufactured by Nihon Keikinzoku K. K.) was used as a coating composition for formation of a low electric resistance undercoating layer. The composition was coated on a biaxially stretched transparent polyester film having a thickness of 75μ (supplied by Toray) by a rod bar coater (0.3 mm in diameter) so that the amount coated was about 5 g/$m^2$, and was dried at 100° C. for 1 minute to obtain a low electric resistance undercoated film for the electrostatic photographic or electrostatic printing.

A coating composition comprising 100 g of toluene and 20 g of a polyester resin (Vylon 30S manufactured by Toyobo K. K.) was used as the coating composition for formation of a high electric resistance toner receiving layer. The composition was coated on the undercoating layer of the above undercoated film by a reverse roll coater so that the amount coated was 3 g/$m^2$, and was dried at 100° C. for 1 minute to obtain a transfer film for the electrostatic photography or electrostatic printing. The transfer operation was carried out on the so obtained transfer film in the same manner as described in Example 4. Good results were obtained as in Example 4.

EXAMPLE 8

A transfer film was prepared in the same manner as described in Example 7 except that a matted polyester film (supplied by Toray) was used instead of the biaxially stretched transparent polyester film used in Example 7. The transfer operation was carried out in the same manner as described in Example 4. Good results were obtained as in Example 4

EXAMPLE 9

A transfer film was prepared in the same manner as described in Example 7 except that the pigment was not incorporated in the undercoating layer-forming composition. The transfer operation was carried out in the same manner as described in Example 4. Good results were obtained as in Example 4.

EXAMPLE 10

The copying operation was carried out in an electrostatic photographic copying machine (Copystar MC-10 manufactured by Mita Industrial Co.) on the transfer film prepared in Example 9. Good results were obtained as in Example 4.

EXAMPLE 11

The copying operation was carried out in an electrostatic photographic copying machine (Copystar 251-R manufactured by Mita Industrial Co.) on the transfer film prepared in Example 9. Good results were obtained as in Example 4.

What we claim is:

1. A transfer film capable of production of a transparent original for projection of images, said transfer film comprising a heat-resistant transparent plastic film substrate, a toner receiving layer constituting a binder resin in an amount of at least $1.0\times10^{10}$ to $1.0\times10^{13}$ Ω, and an undercoating layer interposed between said substrate and said toner receiving layer, said undercoating layer comprising an electrically conductive resin in an amount of at least 25% by weight of the undercoat, said undercoating layer being applied in an amount of at least 1.0 g/m$^2$ and having a surface resistance of $1.0\times10^{6}$ to $9.0\times10^{9}$ Ω.

2. A transfer film as set forth in claim 1 which comprises said substrate, said undercoating layer on both surfaces of the substrate and said toner receiving layer on at least one of said undercoating layers.

3. A transfer film as set forth in claim 1, wherein the undercoating layer is formed in an amount coated of 1.0 to 10.0 g/m$^2$ and the toner receiving layer is formed in an amount coated of 1.0 to 10.0 g/m$^2$.

4. A transfer film as set forth in claim 1, wherein the film substrate is a biaxially stretched polyethylene terephthalate film.

5. A transfer film as set forth in claim 1, wherein said electrically conductive resin is a cationic, electrically conductive resin having a quaternary ammonium group.

6. A transfer film as set forth in claim 1, wherein said electrically conductive resin is an anionic, electrically conductive resin of the sulfonic acid, carboxylic acid or phosphonic acid type.

7. A transfer film as set forth in claim 1, wherein said binder resin is a thermoplastic resin having a glass transition temperature (Tg) of −50° to 150° C.

* * * * *